T. G. HALL.
Feeding-Devices for Grinding-Mills.

No. 156,566. Patented Nov. 3, 1874.

Witnesses.

Thomas G. Hall
Inventor.

UNITED STATES PATENT OFFICE.

THOMAS G. HALL, OF RARITAN, ASSIGNOR OF ONE-HALF HIS RIGHT TO NATHAN S. WYCKOFF, OF CLINTON, NEW JERSEY.

IMPROVEMENT IN FEEDING DEVICES FOR GRINDING-MILLS.

Specification forming part of Letters Patent No. 156,566, dated November 3, 1874; application filed October 13, 1874.

*To all whom it may concern:*

Be it known that I, THOMAS G. HALL, of Raritan, in the county of Somerset and State of New Jersey, have invented a certain Improvement in Feeding Devices for Grinding-Mills, of which the following is a specification:

This invention relates to that class of feeding devices for grinding-mills in which the grain flows from a stationary hopper into a funnel, which reaches down into the eye of the runner-stone, and is vibrated thereby.

My improvement consists in suspending the conducting-funnel, which passes down to near the surface of the bed-stone, by a universal joint, from the journals of the encircling ring, which are both hung in vertically-adjustable slides, its flaring mouth being also provided with a centrally-disposed shallow dish, which, receiving the grain from the throat of the fixed hopper, prevents choking, and insures an even distribution and feed by reason of its swiveling motions, and the permanently maintainable horizontality of the supporting-axes of the universal joint; and also serves as a valve for the hopper-throat, to regulate the amount of feed, which can thus be governed by the vertical adjustment of the funnel.

Figure 1:
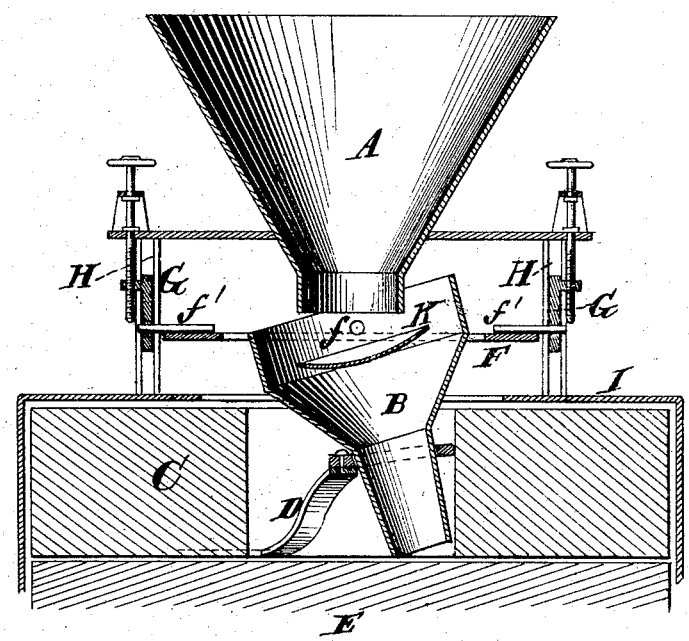
Figure 2:
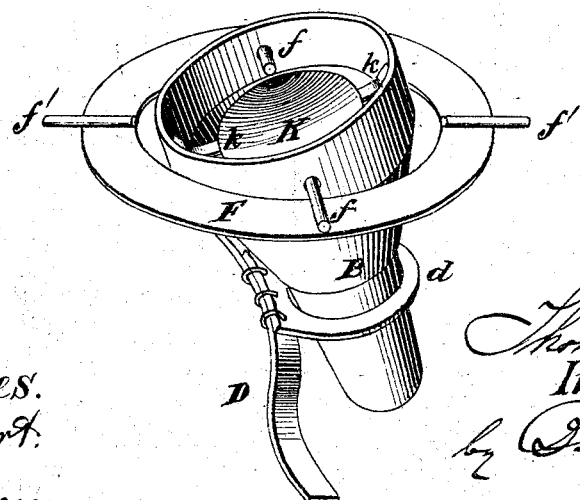

In the annexed drawings, Figure 1 is a vertical central section of my improved feeding device. Fig. 2 is a perspective view of the swiveling funnel, showing also how it is attached to the bail of the runner-stone.

The same letters of reference are employed in both figures in the designation of identical parts.

The grain flows from the stationary hopper A into the flaring mouth of the funnel B, the pipe of which passes down into the eye of the runner-stone C by the side of its bail D, and through a ring, $d$, secured to the said bail, so that it may reach to near the surface of the bed-stone E. The funnel is suspended from pivots or journals $f$ of an encircling ring, F, the journals $f'$ of which turn in bearings of slides G on either side. The axes of the journals $f$ and $f'$ run at right angles, forming a universal-joint connection between the funnel and the slides G. The latter are held between guides H, erected upon the casing I of the stones, and are provided with suitable means for adjusting them vertically, those shown consisting of screw-spindles working in nuts on the slides; but, for this purpose, many other devices may be employed, according as the circumstances in each particular case may demand; but in all cases both slides must be adjustable, so that the horizontality of the journals $f'$ can be preserved, for unless this is maintained the feed must necessarily be uneven, because the dip of the funnel would be uneven. A shallow dish, K, is fixed by arms $k$ centrally within the flaring mouth of the funnel, than which it is considerably smaller in diameter, so as to leave a wide space for the free passage of the grain from it down into the funnel.

The point of intersection of the axial lines of the journals $f$ and $f'$ being vertically over the center of the runner-stone, and the pipe of the funnel being connected eccentrically to the bail of the same, it follows that the rotation of the stone will impart a rotatory vibration to the funnel, causing its mouth and dish K to dip successively in all directions. Thus the column of grain, reaching from the throat of the fixed hopper down onto the dish K, is kept by it in a state of constant agitation by successive action upon all sides, and is also fed successively in all directions down into the funnel, the pipe of which, as it rotates with the runner-stone, distributes the grain in a circular belt over the bed-stone along the edge of the eye of the runner-stone.

My invention can be readily applied to all ordinary grinding-mills, and it affords the means of regulating the feed by the hereinbefore-stated vertical adjustability of the funnel, which shifts the dish K, so as to increase or decrease the discharge from the hopper.

What I claim as my invention, and desire to secure by Letters Patent, is—

The fixed hopper, runner-stone, and funnel B K, pivoted at $f f$, in combination with the ring F, the journals $f' f'$ of which turn in slides G G, both of which are vertically adjustable, substantially as and for the purpose specified.

In testimony whereof I have signed my name to the foregoing specification in the presence of two subscribing witnesses.

THOMAS G. HALL.

Witnesses:
B. EDW. J. EILS,
H. E. QUINN.